US008339043B1

(12) United States Patent
Anderson

(10) Patent No.: US 8,339,043 B1

(45) Date of Patent: Dec. 25, 2012

(54) ARC DISCHARGE WITH IMPROVED ISOTOPIC MIXTURE OF MERCURY

(76) Inventor: James Bernhard Anderson, State College, PA (US)

( * ) Notice: Subject to any disclaimer, the term of this patent is extended or adjusted under 35 U.S.C. 154(b) by 0 days.

(21) Appl. No.: 13/136,916

(22) Filed: Aug. 15, 2011

(51) Int. Cl.
*G01B 9/08* (2006.01)

(52) U.S. Cl. .......... 313/639; 313/623; 313/627; 445/23; 445/26; 445/27

(58) Field of Classification Search .......... 313/623–627, 313/639; 445/23, 26–27; 439/226
See application file for complete search history.

(56) References Cited

U.S. PATENT DOCUMENTS

| | | | | | |
|---|---|---|---|---|---|
| 4,527,086 | A | * | 7/1985 | Maya | 313/485 |
| 4,596,681 | A | * | 6/1986 | Grossman et al. | 264/486 |
| 4,808,136 | A | * | 2/1989 | Schuster | 445/9 |
| 5,024,738 | A | * | 6/1991 | Grossman et al. | 205/562 |
| 5,100,803 | A | * | 3/1992 | Grossman et al. | 436/57 |

* cited by examiner

*Primary Examiner* — Tracie Y Green

(57) ABSTRACT

In a mercury-containing arc discharge device for converting electrical energy into resonance radiation energy, the isotopic distribution of the mercury in the device is altered from that of natural mercury so as to reduce imprisonment time of resonance radiation and thereby increase the efficiency of conversion of electrical energy into resonance radiation. The mercury-199 isotope content of the mercury is lower than that in natural mercury and the mercury-201 and/or mercury-204 isotopes are greater than those in natural mercury.

7 Claims, No Drawings

ARC DISCHARGE WITH IMPROVED ISOTOPIC MIXTURE OF MERCURY

BACKGROUND OF THE INVENTION

The following is a list of some prior art related to the present invention:

U.S. Pat. No. 4,379,252, April 1983, D. E. Work and S. G. Johnson

U.S. Pat. No. 4,527,086, July 1985, J. Maya.

The present invention relates in general to a mercury-containing arc discharge device for converting electrical energy into resonance radiation. More particularly, the present invention is concerned with an improved isotopic mixture of mercury for providing improved efficiency of the device. An example of such a device is a fluorescent lamp.

The basis for the common tubular fluorescent lamp is an electrical discharge in a mixture of mercury vapor and the rare gas argon. Energetic electrons excite the mercury atoms which emit ultraviolet light, which passes to a phosphorescent material coating the inside of the glass tube, and the light is re-emitted as light in the visible spectrum. In passing to the coating the ultraviolet light is absorbed and re-emitted many times by the mercury atoms. In the process some of the excited mercury atoms may lose their energy in 'quenching' collisions with electrons and argon atoms. About 20 percent of the energy of exciting the mercury is lost in way.

About 1978 physicists at the GTE Sylvania Laboratories discovered that adding the isotope mercury-199 to the naturally occurring mixture of mercury isotopes could improve the efficiency of fluorescent lamps by providing an alternative route for the ultraviolet light to reach the tube wall. Tests showed that efficiency could be improved by as much as 5 percent with addition of 2 to 4 percent mercury-196 to natural mercury. The improved device was patented by D. E. Work and S. G. Johnson (U.S. Pat. No. 4,379,252, April 1983), reported by J. Maya et al. in the journal Science (Vol. 226, p. 435, 1984), and described in Science News (Vol. 126, p. 262, 1984). Another version, with an altered composition of mercury isotopes, was patented by J. Maya a year later (U.S. Pat. No. 4,527,086, July 1985).

In the United States fluorescent lamps consume about 2.5 percent of the electrical power produced or 250 billion kilowatt-hours per year. At 10 cents per kilowatt-hour that adds up to 25 billion dollars per year. Saving 5 percent is worth about 1.25 billion dollars per year. Saving 1 percent is worth about 250 million dollars per year. For a 40-watt lamp with a lifetime of 4000 hours this corresponds to 80 cents per lamp over its lifetime.

The use of a tailored mercury isotope mixture would require essentially no changes in lamp manufacture and no changes whatsoever in lamp fixtures. Compact fluorescent lamps operate in the same way as the standard tubular lamps. Their performance is expected to be similarly improved with use of mercury-196.

In the late 1980's GTE Sylvania decided not to manufacture lamps with the mercury-196 added to improve performance. One must guess that it was determined that a somewhat higher price of lamps having a modified mercury composition would limit sales and that the venture was abandoned for that reason.

In 2011 the situation is quite different. Improving lamps by adding mercury-196 is more important and less costly because:

1) Global warming is an environmental consideration.
2) Oil imports from the Middle East are a political and economic consideration.

3) Compact fluorescent lamps are replacing incandescent lamps.
4) Mercury in used fluorescent lamps is (or can be) collected and recycled.
5) With better phosphors now available less mercury is required in each lamp.
6) New energy efficiency requirements imposed by the European Union (as of September 2009) and in the United States (starting in January 2011) favor fluorescent lamps over traditional incandescent lamps.

Standard mercury-rare gas fluorescent lamps have an output of 85 lumens per watt of input power, and are far more efficient than tungsten-filament lamps with only 15 lumens per watt. Currently available LED (light emitting diode) lamps producing white light yield about 30 lumens per watt. Laboratory models are reported to be several times more efficient. It seems likely the LEDs will be improved further, but low-cost fluorescent lamps may be expected to dominate the lighting market for many years.

Clearly, a higher efficiency fluorescent lamp is a useful device. Altering the isotopic composition of the mercury in such lamps as described in the patents mentioned above (U.S. Pat. Nos. 4,379,252 and 4,527,086) can increase the efficiency.

In 1983-1985 I developed a Monte Carlo method for the theoretical treatment of the emission, transmission, and absorption of resonance radiation which was successful in predicting experimental measurements of the ultraviolet spectra and the improvements in efficiency of the lamps with increased mercury-196. This was reported in the journal Physical Review A (J. B. Anderson et al., Vol. 31, p. 2968 (1985). This calculation method has been used quite successfully by a number of scientists in the past 25 years for predicting and understanding the performance of fluorescent lamps and related devices.

I recently reviewed my earlier Monte Carlo calculations in an effort to determine whether they might be applicable to the newer compact fluorescent lamps. I found that the earlier results and conclusions were readily transferred to the compact lamps.

This review led to an important patentable discovery: I discovered new and novel isotopic compositions of mercury that provide improvements in efficiency of fluorescent lamps with less expensive mercury mixtures than those known before. These mixtures yield higher efficiencies than others having similar amounts of the expensive isotope mercury-196.

BRIEF SUMMARY OF THE INVENTION

An object of the invention is to overcome some of the drawbacks of the prior art of arc discharge devices as discussed above.

Another object of the present invention is to provide an improved isotopic mixture of mercury for mercury-containing arc discharge devices.

Another object of the present invention is to provide an improved isotopic mixture as in accordance with the preceding object and which makes it possible to provide a less expensive mixture of mercury.

A further object of the present invention is to provide an improved isotopic mixture of mercury for arc discharge devices, such as fluorescent lamps, which results in a reduction in resonance trapping and increases lamp efficiency.

Still another object of the present invention is to provide an improvement in the efficiency of a fluorescent lamp over and above that obtained with which isotopic mixtures known in the prior art.

Still another object of the present invention is to provide an improvement in the efficiency of a fluorescent lamp over and above that obtained with an isotopic mixtures with the same content of the mercury-196 isotope.

DETAILED DESCRIPTION OF THE INVENTION

The objects of the present invention as described above are achieved, in one aspect of the invention, by the provision of an improved isotope mixture of mercury for use in an arc discharge device and which results in an increased efficiency of the device in converting electrical energy to resonance radiation energy, thereby providing a greater output of ultraviolet light within a typical fluorescent lamp and a greater output of visible light from the lamp for a fixed input of electrical energy.

The improved isotope mixtures contain lower portions of mercury-199, higher portions of mercury-201, and higher portions of mercury-204 than natural mercury. The increased efficiency results from the collisional transfer of energy among mercury-201 isotopes which have nuclear spins of ½, ⅓, and ⅙ and are designated Hg-201a, Hg-201b, and Hg-201c. This transfer allows energy to move rapidly to the Hg-201c isotopes which emit a frequency of resonance radiation less easily trapped in the gas and more readily transferred to the tube wall. This reduces the rate of trapping, the number of quenching collisions, and the associated losses of energy.

The computer simulations of the transfer of energy by photons in the arc discharge predicting the efficiency of resonance energy transfer give full details of the process including the hyperfine structure of the spectra of the resonance radiation. For present purposes the most important result is the 'escape probability' for photon energy, that is, the probability that a unit of resonance energy generated within the discharge reaches the tube wall. Other properties provided by the calculations, such as the lifetime of resonance radiation within a device, can give an indirect indication of the efficiency of the transfer.

The calculations predicted a typical lamp filled with mercury of the natural isotope composition (with 0.15 percent mercury-196) had an ultraviolet photon escape probability of 0.823. For the new mixture containing the same fraction of mercury-196 the escape probability was increased to 0.827. That is an increase of 0.5% in efficiency without even changing the mercury-196 content of the mercury. For 1.0 percent mercury-196 the improvement was 1.1 percent, for 4.0 percent mercury-196 it was 2.2%, and for 12.0 percent mercury-196 it was 2.8 percent. These results are listed in Table 1.

TABLE 1

Escape Probabilities and Increases in Output for Several Isotope Mixtures

| | Natural | New Tailored Mixture | | | | |
|---|---|---|---|---|---|---|
| Isotope | Mercury | A | B | C | D | E |
| | | mole fraction mercury | | | | |
| 196 | 0.0015 | 0.0015 | 0.01 | 0.02 | 0.04 | 0.12 |
| 198 | 0.1002 | 0.0403 | 0.03 | 0.04 | 0.04 | 0.04 |
| 199 | 0.1684 | 0.0101 | 0.02 | 0.01 | 0.01 | 0.01 |
| 200 | 0.2313 | 0.1715 | 0.17 | 0.17 | 0.16 | 0.15 |
| 201 | 0.1322 | 0.1916 | 0.19 | 0.19 | 0.18 | 0.17 |
| 202 | 0.2979 | 0.1916 | 0.16 | 0.19 | 0.19 | 0.17 |
| 204 | 0.0685 | 0.3934 | 0.42 | 0.38 | 0.38 | 0.34 |
| Escape Probability | 0.823 | 0.827 | 0.832 | 0.836 | 0.841 | 0.846 |
| Increase in Output | 0.0% | 0.5% | 1.1% | 1.6% | 2.2% | 2.8% |

To facilitate comparisons identical calculations were made for the several types of mixtures. The predicted improvements in efficiency were less optimistic than claimed for the available experiments, but there are uncertainties in each. The best comparisons are expected for identical calculations. If accurate experiments show higher values for escape probabilities, the ranking of the several mixtures is expected to remain the same as for the calculations. Thus, if earlier claims of increases in efficiency of 5% are correct, then the newly discovered mixtures should yield increases in efficiencies of as much as 6%.

It should be noted that the new mixtures presented here have a decreased mercury-199 and increased mercury-201 and -204 contents while those of the Maya patent (U.S. Pat. No. 4,527,086) have the opposite, an increased mercury-199 and decreased mercury-201 and -204 contents, relative to natural mercury.

In summary, the new isotopic mixtures with lower mercury-199 and higher mercury-201 and mercury-204 were found more efficient at all levels of mercury-196 than for the compositions proposed in the two earlier patents (Work and Johnson, U.S. Pat. No. 4,379,252 and Maya, U.S. Pat. No. 4,527,086). The objects of the present invention are therefore met: higher efficiencies for arc discharges and concomitant higher efficiencies for fluorescent lamps.

REFERENCES CITED

U.S. Pat. No. 4,379,252, April 1983, D. E. Work and S. G. Johnson

U.S. Pat. No. 4,527,086, July 1985, J. Maya.

Journal article: J. Maya et al., Science, Vol. 226, p. 435, (1984).

News article: Science News, Vol. 126, p. 262 (1984).

Journal article: J. B. Anderson et al. Physical Review A, Vol. 31, p. 2968 (1985).

I claim:

1. A mercury-containing arc discharge device for converting electrical energy into resonance radiation energy, the isotope content of the mercury in the device being altered from that of natural mercury, such that the mercury-199 isotope content of the mercury is lower than that in natural mercury and the mercury-201 and/or mercury-204 isotope contents are greater than those in natural mercury, in order to increase the efficiency of conversion of electrical energy into resonance radiation energy.

2. A device as set forth in claim 1 wherein the mercury-196 isotope content of the mercury within the device is greater than that of natural mercury.

3. A device as set forth in claim 1 wherein the mercury-196 isotope content of the mercury within the device is greater than that of natural mercury but equal to or less than 1%.

4. A device as set forth in claim 1 wherein the mercury-199 isotope content of the mercury within the device is less than one-half of that of natural mercury.

5. A device as set forth in claim 1 wherein the resulting mercury mixture has the following isotopic composition: 196 0.15%, 198 4.03%, 199 1.01%, 200 17.15%, 201 19.16%, 202 19.16%, 204 39.34%.

6. A device as set forth in claim 1 wherein the resulting mercury mixture has the following isotopic composition: 196 1.0%, 198 3.0%, 199 2.0%, 200 17.0%, 201 19.0%, 202 16.0%, 204 42.0%.

7. A device as set forth in claim 1 wherein the resulting mercury mixture has the following isotopic composition: 196 2.0%, 198 4.0%, 199 1.0%, 200 17.0%, 201 19.0%, 202 19.0%, 204 38.0%.

* * * * *